(12) United States Patent
Ling et al.

(10) Patent No.: US 11,855,257 B2
(45) Date of Patent: Dec. 26, 2023

(54) FLUORIDE COMPOUNDS AS LITHIUM SUPER-IONIC CONDUCTORS, SOLID ELECTROLYTE AND COATING LAYER FOR LITHIUM METAL BATTERY AND LITHIUM ION BATTERY

(71) Applicants: TOYOTA MOTOR ENGINEERING & MANUFACTURING NORTH AMERICA, INC., Plano, TX (US); UNIVERSITY OF MARYLAND, COLLEGE PARK, College Park, MD (US)

(72) Inventors: Chen Ling, Ann Arbor, MI (US); Ying Zhang, Ann Arbor, MI (US); Yifei Mo, Fulton, MD (US); Qiang Bai, College Park, MD (US)

(73) Assignees: TOYOTA MOTOR ENGINEERING & MANUFACTURING NORTH AMERICA, INC., Plano, TX (US); UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 18/146,605

(22) Filed: Dec. 27, 2022

(65) Prior Publication Data
US 2023/0136520 A1 May 4, 2023

Related U.S. Application Data

(62) Division of application No. 17/060,952, filed on Oct. 1, 2020, now Pat. No. 11,670,799, which is a division
(Continued)

(51) Int. Cl.
*H01M 10/0562* (2010.01)
*H01M 10/0525* (2010.01)
(Continued)

(52) U.S. Cl.
CPC ..... *H01M 10/0562* (2013.01); *H01M 4/0404* (2013.01); *H01M 4/136* (2013.01);
(Continued)

(58) Field of Classification Search
None
See application file for complete search history.

(56) References Cited

U.S. PATENT DOCUMENTS

| | | |
|---|---|---|
| 5,260,821 A | 11/1993 | Chu |
| 6,537,698 B2 | 3/2003 | Gan |
| 2016/0028105 A1 | 1/2016 | Khalifah et al. |

FOREIGN PATENT DOCUMENTS

| | | | |
|---|---|---|---|
| CN | 103904360 A | * | 7/2014 |
| JP | 2008234988 A | * | 10/2008 |

OTHER PUBLICATIONS

Machine Translation of CN-103904360-A. (Year: 2014).*
(Continued)

*Primary Examiner* — Gregg Cantelmo
(74) *Attorney, Agent, or Firm* — Oblon, McClelland, Maier & Neustadt, L.L.P.

(57) ABSTRACT

Solid-state lithium ion electrolytes of lithium fluoride based composites are provided which contain an anionic framework capable of conducting lithium ions. Composites of specific formulae are provided and methods to alter the composite materials with inclusion of aliovalent ions shown. Lithium batteries containing the composite lithium ion electrolytes are provided. Electrodes containing the lithium fluoride based composites are also provided.

8 Claims, 14 Drawing Sheets

Related U.S. Application Data of application No. 16/114,946, filed on Aug. 28, 2018, now Pat. No. 10,854,915.

(51) Int. Cl.

| | | |
|---|---|---|
| *H01M 4/66* | (2006.01) | |
| *H01M 4/04* | (2006.01) | |
| *H01M 4/36* | (2006.01) | |
| *H01M 4/136* | (2010.01) | |
| *H01M 4/58* | (2010.01) | |
| *H01M 10/052* | (2010.01) | |
| *H01M 4/02* | (2006.01) | |

(52) U.S. Cl.
CPC ........... *H01M 4/364* (2013.01); *H01M 4/366* (2013.01); *H01M 4/582* (2013.01); *H01M 4/661* (2013.01); *H01M 10/052* (2013.01); *H01M 10/0525* (2013.01); *H01M 2004/027* (2013.01); *H01M 2004/028* (2013.01); *H01M 2300/008* (2013.01); *H01M 2300/0068* (2013.01); *H01M 2300/0088* (2013.01)

(56) References Cited

OTHER PUBLICATIONS

Machine Translation of JP 2008234988A (Year: 2008).*
Naoki Nitta, et al., "Li-ion battery materials: present and future", Materials Today 18(5):252-264 (2015).
Wentian Gu, et al., "Lithium-Iron Fluoride Battery with In Situ Surface Protection", Adv. Funct. Mater. 26:1507-1516 (2016).
M. Hamadène, et al., "Phase transition in the ternary fluorides $Li_3AlF_6$ and $Li_3CrF_6$", Phase Transitions: A Multinational Journal 73(3):423-437 (2001).
Hidetoshi Utsunomiya, et al., "Influence of conductive additives and surface fluorination on the charge/discharge behavior of lithium titanate ($Li_{4/3}Ti_{5/3}O_4$)", Journal of Power Sources 195:6805-6810 (2010).
M. Kocher, et al., "Lithium tetrafluoroberyllate octafluorozirconate", https://materialsproject.org/materials/mp-559708/, retrieved May 18, 2018.
Jüregen Köhler, A. K. Tyagi, "Crystal structure of β-lithium hexafluorogallate. $Li_3GaF_6$", Z. Kristallogr. NCS 214:25-26 (1999), https://www.researchgate.net/publication/286438720_Crystal_structure_of_ss-lithium_hexafluorogallate_Li3GaF6, Jan. 1999.
Wonchang Choi, et al, "Versatile Coating of Lithium Conductive $Li_2TiF_6$ on Over-Lithiated Layered Oxide in Lithium-Ion Batteries", Electrochimica Acta 117:492-497 (2014).
Julia Kohl, et al, "Synthesis of ternary transition metal fluorides $Li_3MF_6$ via sol-gel route as candidates for cathode materials in lithium-ion batteries", J. Mater. Chem. 22:15819-15827 (2012).
Miyazaki et al. "Li+Ion Conduction of Li3AlF6 Mechanically Milled with CiCl"; ECS Electrochemistry Letters, 1 (6) A87-A89 (Year: 2012).
Roos et al.; "The Courses of the Ammonolyses of the Ammonium Hexafluorometalates of Aluminum, Gallium, and Indium, (NH4) 3MF6 (M=Al, Ga, In)"; Journal of Inorganic and General Chemistry, vol. 626, Issue 5, pp. 1179-1185 (Year: 2000).

* cited by examiner

| Peak Position | Relative Intensity |
|---|---|
| 20.73 | 42.45 |
| 21.11 | 73.20 |
| 21.31 | 100.00 |
| 22.58 | 37.18 |
| 29.50 | 25.60 |
| 30.84 | 31.52 |
| 36.32 | 14.12 |
| 36.66 | 13.72 |
| 40.31 | 15.40 |
| 41.76 | 28.93 |
| 42.46 | 15.04 |
| 49.64 | 18.90 |
| 57.20 | 15.47 |
| 64.82 | 15.20 |

| Peak Position | Relative Intensity |
|---|---|
| 19.87 | 24.38 |
| 21.62 | 100.00 |
| 27.24 | 61.85 |
| 33.95 | 20.80 |
| 40.97 | 82.84 |
| 43.72 | 27.09 |
| 44.94 | 18.46 |
| 53.93 | 46.33 |
| 56.19 | 21.77 |
| 62.35 | 12.96 |
| 68.47 | 28.71 |

| Peak Position | Relative Intensity |
|---|---|
| 14.30 | 91.76 |
| 19.07 | 32.49 |
| 19.68 | 51.72 |
| 21.38 | 100.00 |
| 27.15 | 27.47 |
| 30.81 | 12.83 |
| 33.38 | 49.08 |
| 34.76 | 13.73 |
| 39.05 | 33.81 |
| 39.97 | 33.98 |
| 41.52 | 10.35 |
| 43.84 | 32.26 |
| 44.69 | 15.53 |
| 45.99 | 12.41 |
| 46.03 | 23.14 |
| 52.33 | 17.73 |
| 53.04 | 16.43 |
| 55.92 | 34.62 |
| 55.99 | 25.58 |
| 61.70 | 11.69 |
| 66.77 | 10.35 |

FLUORIDE COMPOUNDS AS LITHIUM SUPER-IONIC CONDUCTORS, SOLID ELECTROLYTE AND COATING LAYER FOR LITHIUM METAL BATTERY AND LITHIUM ION BATTERY

CROSS REFERENCE TO RELATED APPLICATIONS

This application is a divisional application of prior U.S. application Ser. No. 17/060,952, filed Oct. 1, 2020, issued as U.S. Pat. No. 11,670,799 on Jun. 6, 2023, the disclosure of which is incorporated herein by reference in its entirety. U.S. application Ser. No. 17/060,952 is a divisional application of prior U.S. application Ser. No. 16/114,946, filed Aug. 28, 2018, issued as U.S. Pat. No. 10,854,915 on Dec. 1, 2020 the disclosure of which is incorporated herein by reference in its entirety.

THE NAMES OF THE PARTIES TO A JOINT RESEARCH AGREEMENT

The disclosure herein is a result of joint research effort conducted under a joint research agreement between TOYOTA MOTOR ENGINEERING & MANUFACTURING NORTH AMERICA, INC. having an address of 6565 Headquarters Drive W1-3C, Plano, Texas, 75024, and UNIVERSITY OF MARYLAND, COLLEGE PARK having an address of 2130 Mitchell Bldg. 7999 Regents Dr. College Park, Mayland, 20742.

FIELD OF THE DISCLOSURE

This disclosure is directed to novel lithium fluoride compounds useful as a Li super-ionic conductor, solid electrolytes containing the novel lithium fluoride compounds, and an electrode coating layer for a Li metal battery and a Li-ion battery containing the novel lithium fluoride compounds.

BACKGROUND

Li-ion batteries have traditionally dominated the market of portable electronic devices. However, conventional Li-ion batteries contain flammable organic solvents as components of the electrolyte and this flammability is the basis of a safety risk which is of concern and could limit or prevent the use of Li-ion batteries for application in large scale energy storage.

Replacing the flammable organic liquid electrolyte with a solid Li-ion conductive phase would alleviate this safety issue, and may provide additional advantages such as improved mechanical and thermal stability A primary function of the solid Li-ion conductive phase, usually called solid Li-ion conductor or solid state electrolyte, is to conduct $Li^+$ ions from the anode side to the cathode side during discharge and from the cathode side to the anode side during charge while blocking the direct transport of electrons between electrodes within the battery.

Moreover, lithium batteries constructed with nonaqueous electrolytes are known to form dendritic lithium metal structures projecting from the anode to the cathode over repeated discharge and charge cycles. If and when such a dendrite structure projects to the cathode and shorts the battery energy is rapidly released and may initiate ignition of the organic solvent of the nonaqueous electrolyte.

Therefore, there is much interest and effort focused on the discovery of new solid Li-ion conducting materials which would lead to an all solid state lithium battery. Studies in the past decades have focused mainly on ionically conducting oxides such as for example, LISICON ($Li_{14}ZnGe_4O_{16}$), NASICON($Li_{1.3}Al_{0.3}Ti_{1.7}(PO_4)_3$), perovskite (for example, $La_{0.5}Li_{0.5}TiO_3$), garnet ($Li_7La_3Zr_2O_{12}$), LiPON (for example, $Li_{2.88}PO_{3.73}N_{0.14}$) and sulfides, such as, for example, $Li_3PS_4$, $Li_7P_3S_{11}$ and LGPS ($Li_{10}GeP_2S_{12}$).

While recent developments have improved the conductivity of solid Li-ion conductor to the level of 1-10 mS/cm, which is comparable to that in liquid phase electrolyte, finding new Li-ion solid state conductors is of great interest to further improve battery performance and safety.

An effective lithium ion solid-state conductor will have a high $Li^+$ conductivity at room temperature. Generally, the $Li^+$ conductivity should be no less than $10^{-6}$ S/cm. Further, the activation energy of $Li^+$ migration in the conductor must be low for use over a range of operation temperatures that might be encountered in the environment. Additionally, the material should have good stability against chemical, electrochemical and thermal degradation. Unlike many conventionally employed non-aqueous solvents, the solid-state conductor material should be stable to electrochemical degradation reactivity with the anode and cathode chemical composition. The material should have low grain boundary resistance for usage in an all solid-state battery. Ideally, the synthesis of the material should be easy and the cost should not be high. Unfortunately, none of the currently known lithium ion solid electrolytes meet all these criteria. For example, $Li_{10}GeP_2S_{12}$ fails to meet the requirement of electrochemical stability and has a high cost due to the presence of Ge, despite its state-of-art Li conductivity. Environmentally stable composite materials having high $Li^+$ conductivity and low activation energy would be sought in order to facilitate manufacturing methods and structure of the battery.

The standard redox potential of Li/Li+ is −3.04 V, making lithium metal one of the strongest reducing agents available. Consequently, Li metal can reduce most known cationic species to a lower oxidation state. Because of this strong reducing capability when the lithium metal of an anode contacts a solid-state $Li^+$ conductor containing cation components different from lithium ion, the lithium reduces the cation specie to a lower oxidation state and deteriorates the solid-state conductor.

For example, the conductor of formula:

$$Li_3PS_4$$

contains $P^{5+}$ in the formula and is thus a secondary cation to the $Li^+$. When in contact with Li metal, reduction according to the following equation occurs (J. Mater. Chem. A, 2016, 4, 3253-3266).

$$Li_3PS_4 + 5Li \rightarrow P + 4Li_2S$$

$$P + 3Li \rightarrow Li_3P$$

Similarly, $Li_{10}GeP_2S_{12}$ has also been reported to undergo degradation when in contact with lithium metal according to the following equations (J. Mater. Chem. A, 2016,4, 3253-3266):

$$Li_{10}GeP_2S_{12} + 10Li \rightarrow 2P + 8Li_2S + Li_4GeS_4$$

$$P + 3Li \rightarrow Li_3P$$

$$4Li_4GeS_4 + 31Li \rightarrow 16Li_2S + Li_{15}Ge_4$$

$Li_{10}GeP_2S_{12}$ contains $Ge^{4+}$ and $P^{5+}$ and each is reduced as indicated.

In another example, $Li_7La_3Zr_2O_{12}$, which contains secondary cations $La^{3+}$ and $Zr^{4+}$ undergoes chemical degradation when in contact with lithium metal according to the following chemistry (J. Mater. Chem. A, 2016,4, 3253-3266):

$$6Li_7La_3Zr_2O_{12}+40Li \rightarrow 4Zr_3O+41Li_2O+9La_2O_3$$

$$Zr_3O+2Li \rightarrow Li_2O+3Zr$$

$$La_2O_3+6Li \rightarrow 2La+3Li_2O$$

Thus, many current conventionally known solid Li-ion conductors suffer a stability issue when in contact with a Li metal anode.

The inventors of this application have been studying lithium composite compounds which may serve for future use of solid-state conductors and previous results of this study are disclosed in U.S. application Ser. No. 15/626,696, filed Jun. 19, 2017, issued Dec. 18, 2018, as U.S. Pat. No. 10,158,142, U.S. Ser. No. 15/805,672, filed Nov. 7, 2017, issued Dec. 17, 2019, as U.S. Pat. No. 10,511,054 and U.S. application Ser. No. 16/013,495, filed Jun. 20, 2018, issued Jul. 14, 2020, as U.S. Pat. No. 10,714,788. However, research effort continues to discover additional composites having maximum efficiency, high stability, low cost and ease of handling and manufacture.

Accordingly, an object of this application is to identify a range of further materials having high Li ion conductivity while being poor electron conductors which are suitable as a solid state electrolyte for a lithium ion battery and/or suitable as a protective coating layer for an electrode active material.

A further object of this application is to provide a solid state lithium ion battery and/or Lithium metal battery containing a solid state Li ion electrolyte membrane.

SUMMARY OF THE EMBODIMENTS

These and other objects are provided by the embodiments of the present application, the first embodiment of which includes a solid-state lithium ion electrolyte, comprising: at least one material selected from the group of compounds of formulae (I), (II), (III) and (IV):

$$Li_y(M1)_{x1}GaF_6 \qquad (I)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_yGa_{1-x2}(M2)_{x2}F_6 \qquad (II)$$

wherein x2 is a number from greater than 0 to less then 1, y is a value such that charge neutrality is obtained, and M2 is at least one element different from Ga selected from elements of groups 1, 2, 3, 4, 5, 6, 7, 8, 9, 10, 11, 12, 13, 14, 16 and 17;

$$Li_yGaF_{6-x3}(X)_{x3} \qquad (III)$$

wherein x3 is a number from greater than 0 to less than 6, y is a value such that charge neutrality is obtained, and X is at least one element different from F selected from elements of groups 15, 16 and 17; and $$Li_3GaF_6 \qquad (IV).$$

In another aspect of the first embodiment the material has a lithium ion conductivity of from 0.005 to 2.4 mS/cm at 300K, an activation energy of from 0.2 eV to 0.50 eV, and the materials comprise a crystal lattice structure having a monoclinic unit cell.

In a second embodiment a solid-state lithium ion electrolyte, comprising: at least one material selected from the group of compounds of formulae (V), (VI) and (VII) is provided:

$$Li_y(M1)_{x1}TiF_6 \qquad (V)$$

wherein x1 is a number from greater than 0 to less than 2, y is a value such that charge neutrality is obtained, and M1 is at least one element different from Li selected from elements of groups 1, 2, 3, 4, 5, 6, 7, 8, 9, 10, 11, 12 and 13;

$$Li_yTi_{1-x2}(M2)_{x2}F_6 \qquad (VI)$$

wherein x2 is a number from greater than 0 to less than 1, y is a value such that charge neutrality is obtained, and M2 is at least one element different from Ti selected from elements of groups 3, 4, 5, 6, 7, 8, 9, 10, 11, 12, 14, 16 and 17; and $$Li_yTi F_{6-x3}(X)_{x3} \qquad (VII)$$

wherein x3 is a number from greater than 0 to less than 6, y is a value such that charge neutrality is obtained, and X is at least one element different from F selected from elements of groups 15, 16 and 17.

In an aspect of the second embodiment the composite material has a lithium ion conductivity of from 0.1 to 10 mS/cm at 300K, an activation energy of from 0.2 eV to 0.35 eV, and the materials comprise a crystal lattice structure having a tetragonal unit cell.

In a third embodiment a solid-state lithium ion electrolyte, comprising: at least one material selected from the group of compounds of formulae (IX), (X), (XI), (XII) and (XIII) is provided:

$$Li_y(M1)_{x1}ZrBeF_{12} \qquad (IX)$$

wherein x1 is a number from greater than 0 to less than 6, y is a value such that charge neutrality is obtained, and M1 is at least one element different from Li selected from elements of groups 1, 2, 3, 4, 5, 6, 7, 8, 9, 10, 11, 12 and 13;

$$Li_yZr_{1-x2}(M2)_{x2} BeF_{12} \qquad (X)$$

wherein x2 is a number from greater than 0 to less than 1, y is a value such that charge neutrality is obtained, and M2 is at least one element different from Zr selected from elements of groups 3, 4, 5, 6, 7, 8, 9, 10, 11, 12, 14, 15 and 17; and $$Li_yZrBe_{1-x3}(M3)_{x3}F_{12} \qquad (XI)$$

wherein x3 is a number from greater than 0 to less than 1, y is a value such that charge neutrality is obtained, and M3 is at least one element different from Be selected from elements of groups 1, 2, 13, 14, 15 and 16; and $$Li_yZrBeF_{12-x4}(X)_{x4} \qquad (XII)$$

wherein x4 is a number from greater than 0 to less than 12, y is a value such that charge neutrality is obtained, and X is at least one element different from F selected from elements of groups 15, 16 and 17; and $$Li_6ZrBeF_{12} \qquad (XIII).$$

In an aspect of the third embodiment the composite material has a lithium ion conductivity of from 0.001 to 0.1 mS/cm at 300K, an activation energy of from 0.30 eV to 0.50 eV, and the materials comprise a crystal lattice structure having a tetragonal unit cell.

In a fourth embodiment the present disclosure provides a solid state lithium battery, comprising: an anode; a cathode; and a solid state lithium ion electrolyte located between the anode and the cathode; wherein the solid state lithium ion electrolyte comprises at least one material selected from the group of compounds of formulae (I), (II), (III) and (IV):

$$Li_y(M1)_{x1}GaF_6 \qquad (I)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_yGa_{1-x2}(M2)_{x2}F_6 \qquad (II)$$

wherein x2 is a number from greater than 0 to less then 1, y is a value such that charge neutrality is obtained, and M2 is at least one element different from Ga selected from elements of groups 1, 2, 3, 4, 5, 6, 7, 8, 9, 10, 11, 12, 14, 16 and 17;

$$Li_yGaF_{6-x3}(X)_{x3} \qquad (III)$$

wherein x3 is a number from greater than 0 to less than 6, y is a value such that charge neutrality is obtained, and X is at least one element different from F selected from elements of groups 15, 16 and 17; and $$Li_3GaF_6 \qquad (IV).$$

In a fifth embodiment the present disclosure provides a solid state lithium battery, comprising: an anode; a cathode; and a solid state lithium ion electrolyte located between the anode and the cathode; wherein the solid state lithium ion electrolyte comprises at least one material selected from the group of compounds of formulae (V), (VI) and (VII):

$$Li_y(M\ 1)_{x1}TiF_6 \qquad (V)$$

wherein x1 is a number from greater than 0 to less than 2, y is a value such that charge neutrality is obtained, and M1 is at least one element different from Li selected from elements of groups 1, 2, 3, 4, 5, 6, 7, 8, 9, 10, 11, 12 and 13;

$$Li_yTi_{1-x2}(M^2)_{x2}F_6 \qquad (VI)$$

wherein x2 is a number from greater than 0 to less than 1, y is a value such that charge neutrality is obtained, and M2 is at least one element different from Ti selected from elements of groups 3, 4, 5, 6, 7, 8, 9, 10, 11, 12, 14, 16 and 17; and $$Li_yTiF_{6-x3}(X)_{x3} \qquad (VII)$$

wherein x3 is a number from greater than 0 to less than 6, y is a value such that charge neutrality is obtained, and X is at least one element different from F selected from elements of groups 15, 16 and 17.

In a sixth embodiment the present disclosure provides a solid state lithium battery, comprising: an anode; a cathode; and a solid state lithium ion electrolyte located between the anode and the cathode; wherein the solid state lithium ion electrolyte comprises at least one material selected from the group of compounds of formulae (IX), (X),(XI), (XII) and (XIII):

$$Li_y(M1)_{x1}ZrBeF_{12} \qquad (IX)$$

wherein x1 is a number from greater than 0 to less than 6, y is a value such that charge neutrality is obtained, and M1 is at least one element different from Li selected from elements of groups 1, 2, 3, 4, 5, 6, 7, 8, 9, 10, 11, 12 and 13;

$$Li_yZr_{1-x2}(M2)_{x2}BeF_{12} \qquad (X)$$

wherein x2 is a number from greater than 0 to less than 1, y is a value such that charge neutrality is obtained, and M2 is at least one element different from Zr selected from elements of groups 3, 4, 5, 6, 7, 8, 9, 10, 11, 12, 14, 15 and 17; and $$Li_yZrBe_{1-x3}(M3)_{x3}F_{12} \qquad (XI)$$

wherein x3 is a number from greater than 0 to less than 1, y is a value such that charge neutrality is obtained, and M3 is at least one element different from Be selected from elements of groups 1, 2, 13, 14, 15 and 16; and $$Li_yZrBeF_{12-x4}(X)_{x4} \qquad (XII)$$

wherein x4 is a number from greater than 0 to less than 12, y is a value such that charge neutrality is obtained, and X is at least one element different from F selected from elements of groups 15, 16 and 17; and $$Li_6ZrBeF_{12} \qquad (XIII).$$

In special aspects of the fourth through sixth embodiments, the solid state lithium battery may be a lithium metal battery or a lithium ion battery.

In a seventh embodiment the present disclosure provides an electrode having a current collector, an electrode active material mixed with one or more of the materials of formulae (I) to (VII) and (IX) to (XIII) and/or a coating layer of a material according to any of formulae (I) to (VII) and (IX) to (XIII) as described in the previous embodiments and aspects thereof is provided. Further, solid state batteries containing any of the electrodes of the seventh embodiment are provided.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DESCRIPTION OF THE PREFERRED EMBODIMENTS

Figure 1:
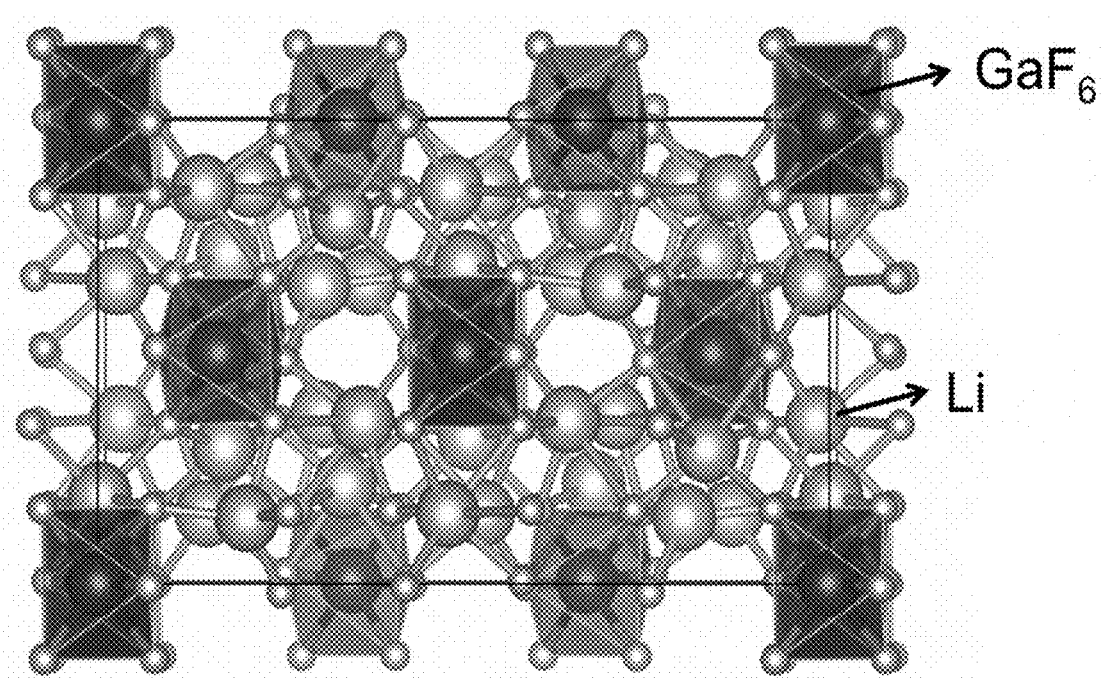
FIG. 1 shows the crystal structure of $Li_3GaF_6$.

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently.

In the chemical formulae provided the term "less than" indicates less than the full value of the number stated. Thus, "less than" may mean a value up to 0.9 of the expressed number. For example, if the number indicated is 3, a number less than 3 may be 2.7. Further, a number "greater than 0" indicates a number of at least 0.01 or greater.

Structural characteristics of effective Li$^+$ conducting crystal lattices have been described by Ceder et al. (Nature Materials, 14, 2015, 1026-1031) in regard to known Li$^+$ ion conductors Li$_{10}$GeP$_2$S$_{12}$ and Li$_7$P$_3$S$_{11}$, where the sulfur sublattice of both materials was shown to very closely match a bcc lattice structure. Further, Li$^+$ ion hopping across adjacent tetrahedral coordinated Li$^+$ lattice sites was indicated to offer a path of lowest activation energy.

The inventors are conducting ongoing investigations of new lithium composite compounds in order to identify materials having the properties which may serve as solid-state electrolytes in solid state lithium batteries. Such materials may also have utility as components of an electrode active material to improve capacity and/or cycling performance. Additionally and/or alternatively, such composite materials may be employed as protecrice coatings on an electrode active layer. In the course of this ongoing study and effort the inventors have developed and implemented a methodology to identify composite materials which have chemical and structural properties which have been determined by the inventors as indicators of lithium ion conductance suitable to be a solid state electrolyte for a lithium-ion battery.

To qualify as solid state electrolyte in practical applications, the material must meet several certain criteria. First, it should exhibit desirable Li-ion conductivity, usually no less than 10$^{-6}$ S/cm at room temperature. Second, the material should have good stability against chemical, electrochemical and thermal degradation. Third, the material should have low grain boundary resistance for usage in all solid-state battery. Fourth, the synthesis of the material should be easy and the cost should not be high.

A criterion of this methodology requires that to qualify as solid state electrolyte in practical application, the material must exhibit desirable Li-ion conductivity, usually no less than 10$^{-6}$ S/cm at room temperature. Thus, ab initio molecular dynamics simulation studies were applied to calculate the diffusivity of Li ion in the lattice structures of selected lithium metal sulfide materials. In order to accelerate the simulation, the calculation was performed at high temperatures and the effect of excess Li or Li vacancy was considered. In order to create excess Li or Li vacancy, aliovalent replacement of cation or anions may be evaluated. Thus, Li vacancy was created by, for example, partially substituting Si with aliovalent cationic species while compensating the charge neutrality with Li vacancy or excess Li. For example, replacing 50% of Si in Li$_{10}$Si$_2$PbO$_{10}$ with P results in the formation of Li$_9$PSiPbO$_{10}$.

The diffusivity at 300 K was determined according to equation (I)

$$D = D_0 \exp(-E_a/k_b T) \qquad \text{equation (I)}$$

where $D_0$, $E_a$ and $k_b$ are the pre-exponential factor, activation energy and Boltzmann constant, respectively. The conductivity is related with the calculated diffusivity according to equation (II):

$$\sigma = D_{300} \rho e^2 / k_b T \qquad \text{equation (II)}$$

where $\rho$ is the volumetric density of Li ion and e is the unit charge.

The anionic lattice of Li-ion conductors has been shown to match certain lattice types (see Nature Materials, 14, 2015, 2016). Therefore, in the anionic lattice of the potential Li$^+$ ion conductor is compared to the anionic lattice of Li$^+$ ion conductor known to have high conductivity.

Thus, selected lithium metal fluoride compounds were compared to Li-containing, compounds reported in the inorganic crystal structure database (FIZ Karlsruhe ICSD -https://icsd.fiz-karlsruhe.de) and evaluated in comparison according to an anionic lattice matching method developed by the inventors for this purpose and described in copending application Ser. No. 15/597,651, filed May 17, 2017, issued Sep. 15, 2020, as U.S. Pat. No. 10,773,959, to match the lattice of these compounds to known Li-ion conductors.

Elements suitable for aliovalent substitution may be selected by an ionic substitution probability determined by the method as described by Hautier et al. (Inorg. Chem. 2011, 50, 656-663) wherein candidate dopants may be selected by an ionic substitution probabilistic model, constructed upon data mining of all known inorganic crystal materials. Dopants which could potentially create vacancies or interstitials within the particular materials were included. The structures with dopants that were not energetically favorable would be screened and excluded during phase stability calculations. The configurations of the sublattices, dopants, and vacancies or interstitials were determined by the computation methods described herein. Such methods have been described for example, in the following reports:

Bai et al., ACS Appl. Energy Mater. 2018, 1, 1626-1634; and

He et al., Phys. Chem. Chem. Phys., 2015. 17, 18035.

According to the anionic lattice matching method described in copending U.S. application Ser. No. 15/597, 651, an atomic coordinate set for the compound lattice structure may be converted to a coordinate set for only the anion lattice. The anions of the lattice are substituted with the anion of the comparison material and the obtained unit cell rescaled. The x-ray diffraction data for modified anion-only lattice may be simulated and an n×2 matrix generated from the simulated diffraction data. Quantitative structural similarity values can be derived from the n×2 matrices.

The purpose of anionic lattice matching is to further identify compounds with greatest potential to exhibit high Li$^+$ conductivity. From this work, the compounds described in the embodiments which follow were determined to be potentially suitable as solid-state Li$^+$ conductors.

Ab initio molecular dynamics (AIMD) simulation was then applied to predict the conductivity of the targeted lithium metal fluoride compounds. The initial structures were statically relaxed and were set to an initial temperature of 100 K. The structures were then heated to targeted temperatures (600-1300 K) at a constant rate by velocity scaling over a time period of 2 ps. The total time of AIMD simulations were in the range of 200 to 400 ps. Typical examples of the calculated diffusivity as a function of temperature are shown in FIGS. 10-17 for samples of $Li_3GaF_6$, $Li_2TiF_6$ and $Li_6ZrBeF_{12}$ doped with Li or O. The $Li^+$ diffusivity at different temperatures from 600-1300 K follows an Arrhenius-type relationship. The Li+ diffusion trajectories and network in each of the doped samples calculated from AIMD simulations are also shown.

Applying equation (I) above the diffusivity at 300 K was determined and then the conductivity may be determined using the link between conductivity and diffusivity of equation (II). Table 1 shows the activation energy and room temperature conductivity determined for each of the samples of FIGS. 10-17.

TABLE 1

Activation energy and room temperature conductivity of $Li_{3.75}Ga_{0.75}F_6$, $Li_{3.33}GaO_{0.33}F_{5.67}$, $Li_3TiOF_5$, and $Li_7ZrBe_{0.5}F_{12}$ from AIMD simulations.

| Composition | $E_a$ (eV) | σ (mS/cm) at 300K |
|---|---|---|
| $Li_{3.75}Ga_{0.75}F_6$ | 0.27 | 2.36 |
| $Li_{3.33}GaO_{0.33}F_{5.67}$ | 0.49 | 0.005 |
| $Li_3TiOF_5$ | 0.29 | 0.92 |
| $Li_7ZrBe_{0.5}F_{12}$ | 0.44 | 0.01 |

As indicated, many of the compounds have conductivities above $10^{-3}$ S/cm, thus meeting one of the requirements to be suitable as a solid Li-ion conductor. Moreover, these $Li_3GaF_6$, $Li_2TiF_6$, $Li_6ZrBeF_{12}$ compounds would form stable passivation layers against a Li metal anode or cathode materials which are Li+ conductor and e-insulator, protecting the Li metal anode while exhibiting low interfacial resistance. This stability may also be maintained while cycling voltage is applied to the battery where this material is used as a component.

Accordingly, the first embodiment provides a solid-state lithium ion electrolyte, comprising: at least one material selected from the group of compounds of formulae (I), (II), (III) and (IV):

$$Li_y(M1)_{x1}GaF_6 \quad (I)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_yGa_{1-x2}(M2)_{x2}F_6 \quad (II)$$

wherein x2 is a number from greater than 0 to less then 1, y is a value such that charge neutrality is obtained, and M2 is at least one element different from Ga selected from elements of groups 1, 2, 3, 4, 5, 6, 7, 8, 9, 10, 11, 12, 13, 14, 16 and 17;

$$Li_yGaF_{6-x3}(X)_{x3} \quad (III)$$

wherein x3 is a number from greater than 0 to less than 6, y is a value such that charge neutrality is obtained, and X is at least one element different from F selected from elements of groups 15, 16 and 17; and $$Li_3GaF_6 \quad (IV).$$

Figures 2, 3:
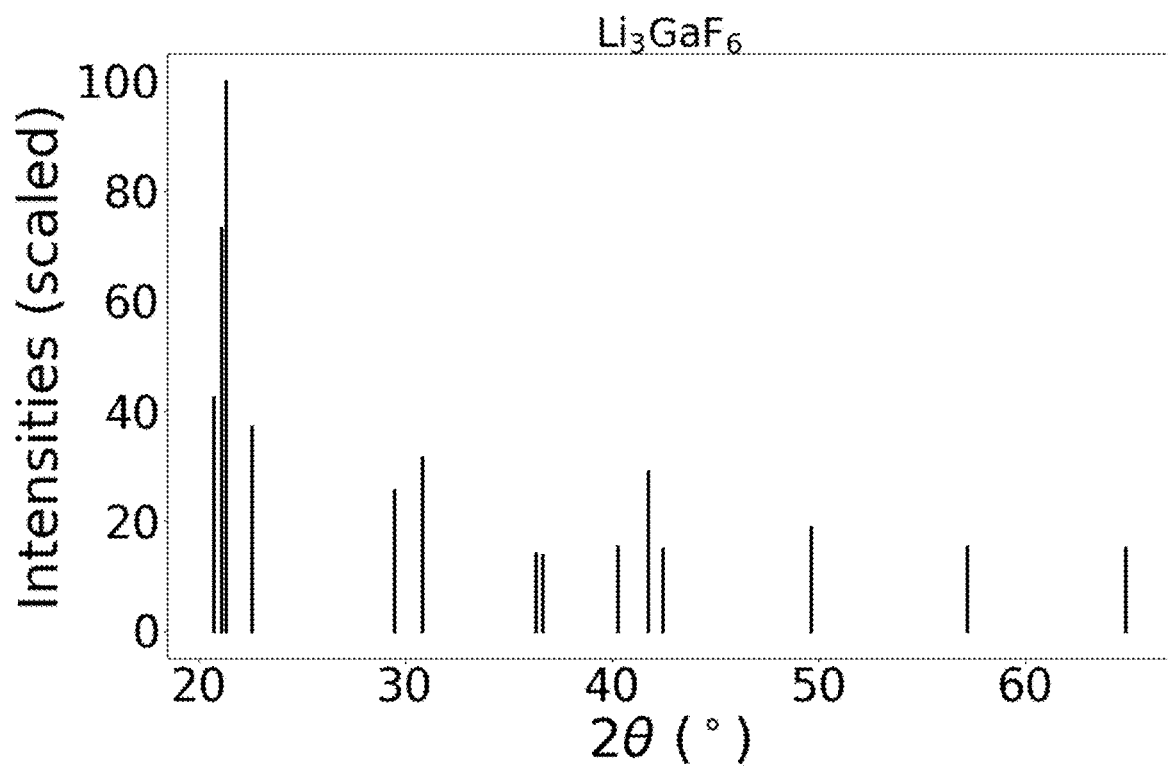
FIG. 2 shows a calculated XRD analysis obtained based on Cu-Kα radiation with wavelength of 1.54184 Å. of the $Li_3GaF_6$.
FIG. 3 shows a Table listing the major peak positions (2θ) and relative intensities for the XRD analysis of FIG. 2.

The composites of formulae (I) to (III) are doped materials of the compound of formula (IV):

$$Li_3GaF_6 \quad (IV)$$

wherein at least one of Li, Ga and F are aliovalently replaced with elements selected as described above. The crystal structure of $Li_3GaF_6$ is shown in FIG. 1. A calculated X-ray diffraction analysis characteristic of the composites (I)-(IV) obtained based on Cu-Kα radiation with wavelength of 1.54184 Å is shown in FIG. 2 and a Table showing the major peak positions (2θ) is shown in FIG. 3.

The inventors have learned that the resulting doped materials according to formulae (I) to (III) retain the crystal structure of the base compound (IV) and have activation energies and conductivity related to the base compound of formula (IV). Based on the measurement methods described above the lithium ion ($Li^+$) conductivity of the composite materials of formulae (I), (II) and (III) may be from 0.005 to 2.4 mS/cm at 300K, preferably from 0.01 to 2.4 mS/cm at 300K and most preferably from 0.01 to 2.4 mS/cm at 300K. The activation energy of the the composite materials of formulae (I), (II) and (III) may be from 0.2 eV to 0.50 eV. The composite materials of formulae (I), (II) and (III) comprise a crystal lattice structure having a monoclinic unit cell.

In a second embodiment, the present disclosure provides a solid-state lithium ion electrolyte, comprising: at least one material selected from the group of compounds of formulae (V), (VI) and (VII):

$$Li_y(M1)_{x1}TiF_6 \quad (V)$$

wherein x1 is a number from greater than 0 to less than 2, y is a value such that charge neutrality is obtained, and M1 is at least one element different from Li selected from elements of groups 1, 2, 3, 4, 5, 6, 7, 8, 9, 10, 11, 12 and 13;

$$Li_yTi_{1-x2}(M^2)_{x2}F_6 \quad (VI)$$

wherein x2 is a number from greater than 0 to less than 1, y is a value such that charge neutrality is obtained, and M2 is at least one element different from Ti selected from elements of groups 3, 4, 5, 6, 7, 8, 9, 10, 11, 12, 14, 16 and 17; and $$Li_yTiF_{6-x3}PO_{x3} \quad (VII)$$

wherein x3 is a number from greater than 0 to less than 6, y is a value such that charge neutrality is obtained, and X is at least one element different from F selected from elements of groups 15, 16 and 17.

The materials of formulae (V) to (VII) are doped materials of the compound of formula (VIII):

$$Li_2TiF_6 \quad (VIII)$$

wherein at least one of Li, Ti and F are aliovalently replaced with elements selected as described above.

Figure 4:
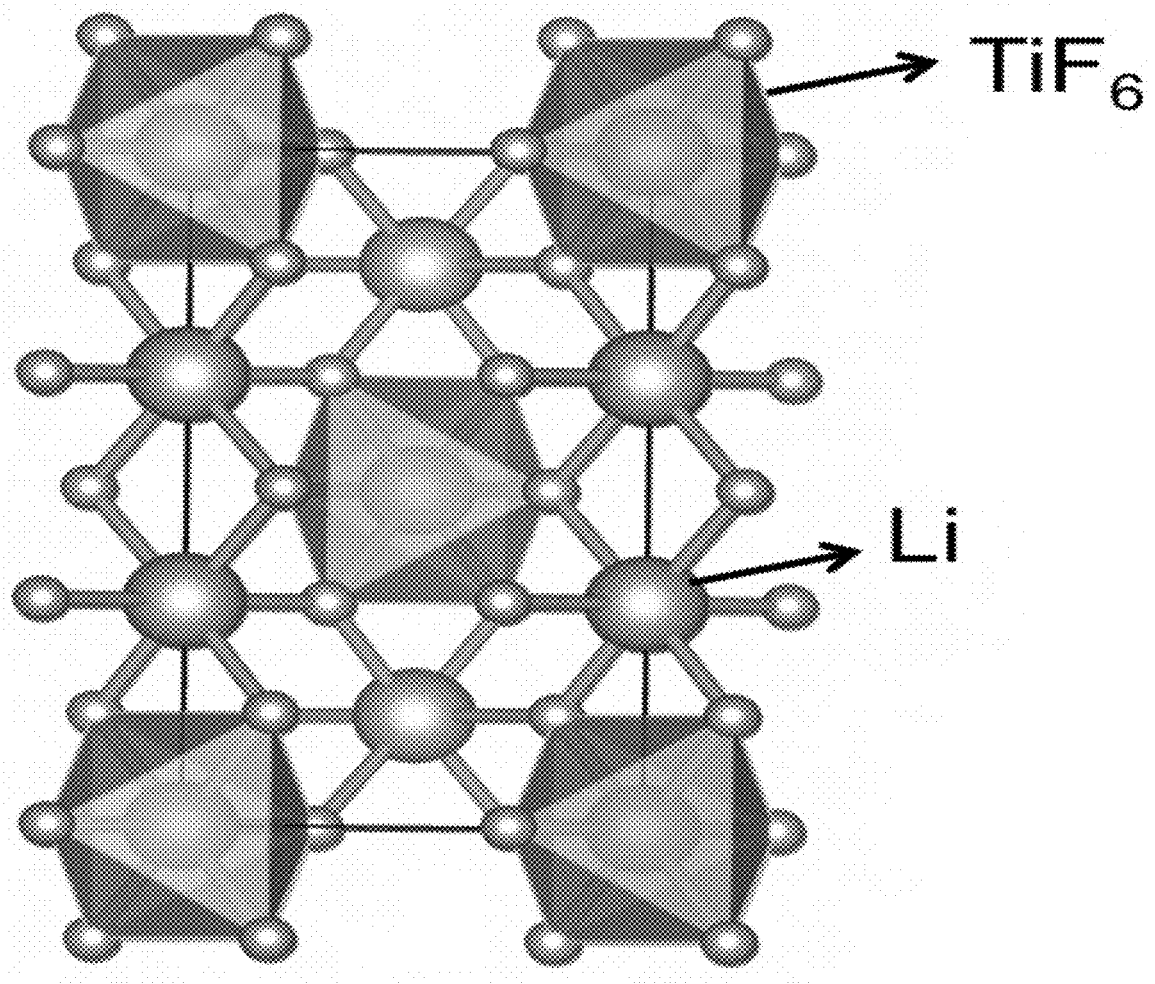
FIG. 4 shows the crystal structure of $Li_2TiF_6$.
Figures 5, 6:
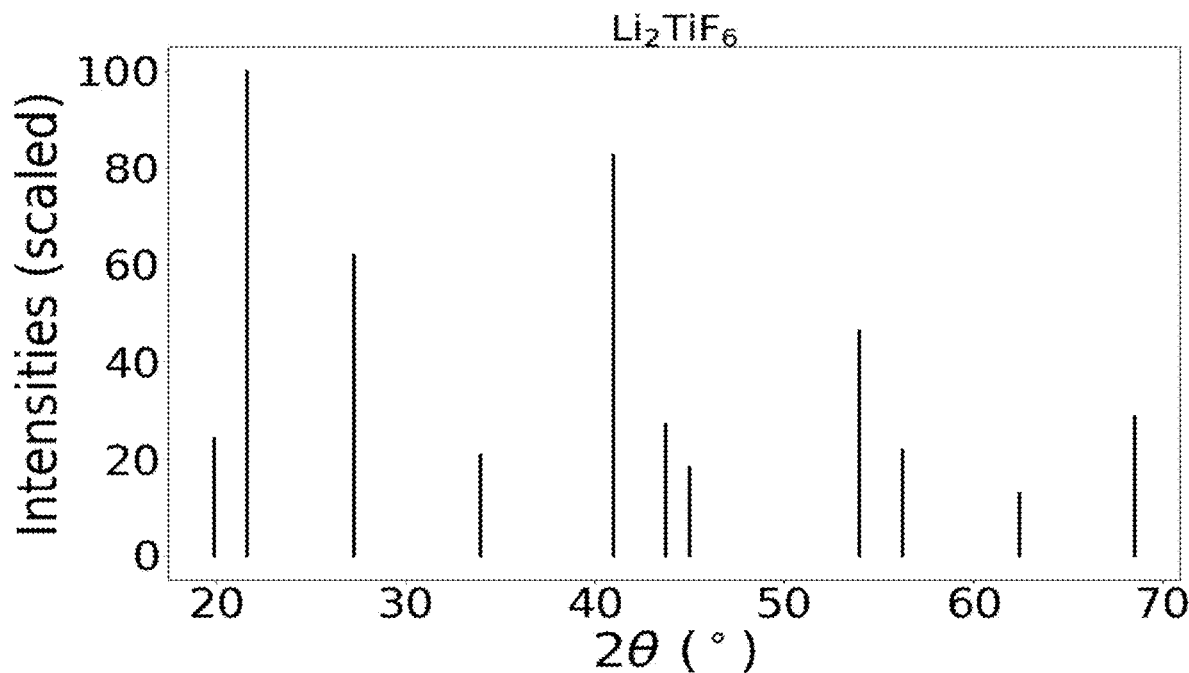
FIG. 5 shows a calculated XRD analysis obtained based on Cu-Kα radiation with wavelength of 1.54184 Å of the $Li_2TiF_6$.
FIG. 6 shows a Table listing the major peak positions (2θ) and relative intensities for the XRD analysis of FIG. 5.

The crystal structure of $Li_2TiF_6$ is shown in FIG. 4. A calculated X-ray diffraction analysis for $Li_2TiF_6$ obtained based on Cu-Kα radiation with wavelength of 1.54184 Å is shown in FIG. 5 and a Table showing the major peak positions (2θ) is shown in FIG. 6.

The inventors have learned that the resulting doped materials according to formulae (V) to (VII) retain the crystal structure of the base compound (VIII) and have activation energies and conductivity related to the base compound of formula (VIII). Based on the measurement methods described above the lithium ion ($Li^+$) conductivity of the composite materials of formulae (V), (VI) and (VII) may be from 0.1 to 10 mS/cm at 300K. The activation energy of the materials of formulae (V), (VI) and (VII) may be from 0.2 eV to 0.35 eV. The materials of formulae (V), (VI) and (VII) comprise a crystal lattice structure having a tetragonal unit cell.

In a third embodiment, the present disclosure provides a solid-state lithium ion electrolyte, comprising: at least one material selected from the group of compounds of formulae (IX), (X), (XI), (XII) and (XIII):

$$Li_y(M1)_{x1}ZrBeF_{12} \quad (IX)$$

wherein x1 is a number from greater than 0 to less than 6, y is a value such that charge neutrality is obtained, and M1 is at least one element different from Li selected from elements of groups 1, 2, 3, 4, 5, 6, 7, 8, 9, 10, 11, 12 and 13;

$$Li_yZr_{1-x2}(M2)_{x2}BeF_{12} \quad (X)$$

wherein x2 is a number from greater than 0 to less than 1, y is a value such that charge neutrality is obtained, and M2 is at least one element different from Zr selected from elements of groups 3, 4, 5, 6, 7, 8, 9, 10, 11, 12, 14, 15 and 17; and $$Li_yZrBe_{1-x3}(M3)_{x3}F_{12} \quad (XI)$$

wherein x3 is a number from greater than 0 to less than 1, y is a value such that charge neutrality is obtained, and M3 is at least one element different from Be selected from elements of groups 1, 2, 13, 14, 15 and 16; and $$Li_yZrBeF_{12-x4}(X)_{x4} \quad (XII)$$

wherein x4 is a number from greater than 0 to less than 12, y is a value such that charge neutrality is obtained, and X is at least one element different from F selected from elements of groups 15, 16 and 17; and $$Li_6ZrBeF_{12} \quad (XIII).$$

The materials of formulae (IX) to (XII) are doped materials of the compound of formula (XIII):

$$Li_6ZrBeF_{12} \quad (XIII)$$

wherein at least one of Li, Zr, Be and F are aliovalently replaced with elements selected as described above.

Figure 7:
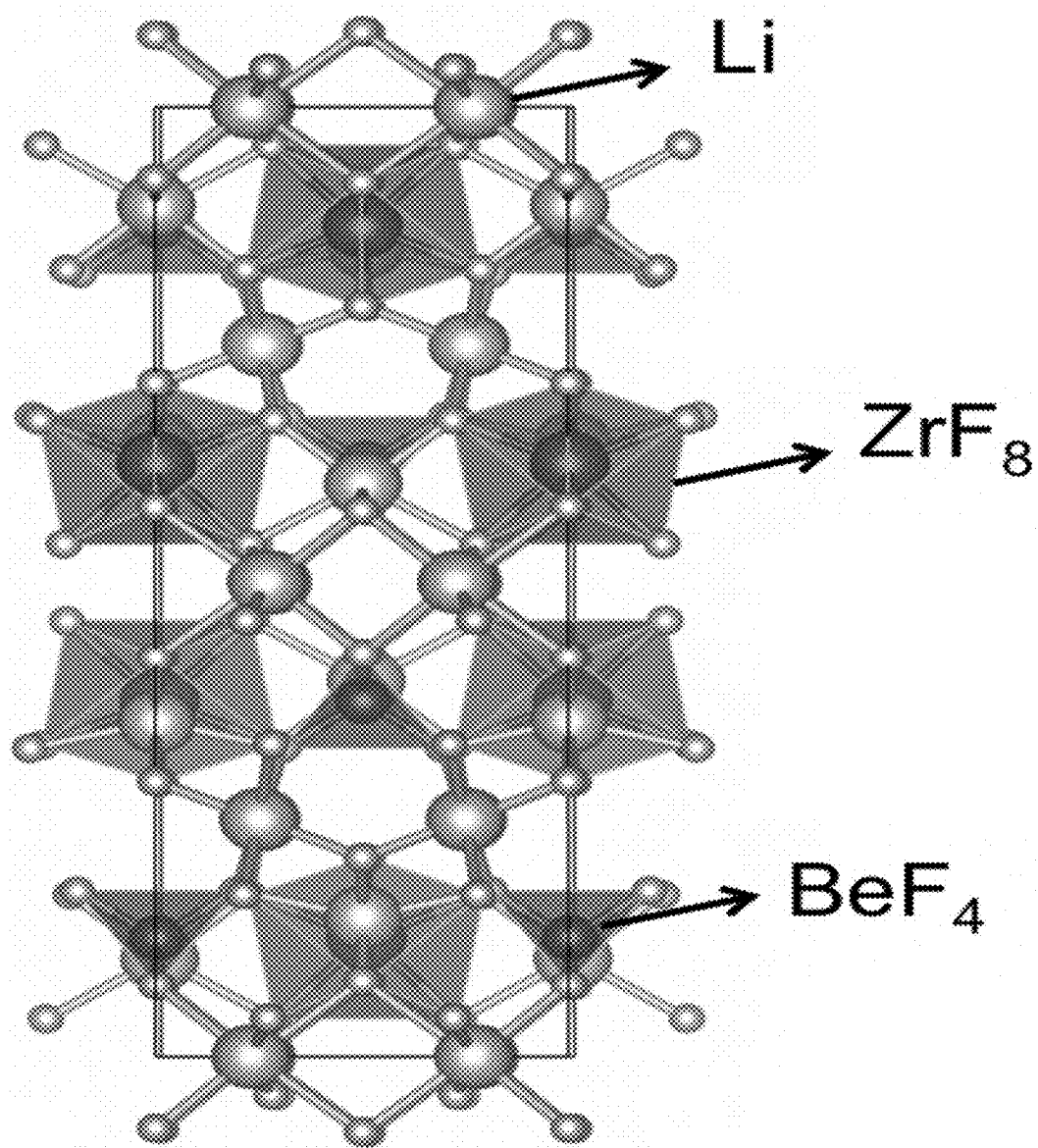
FIG. 7 shows the crystal structure of $Li_6ZrBeF_{12}$.

The crystal structure of $Li_6ZrBeF_{12}$ is shown in FIG. 7.

Figures 8, 9:
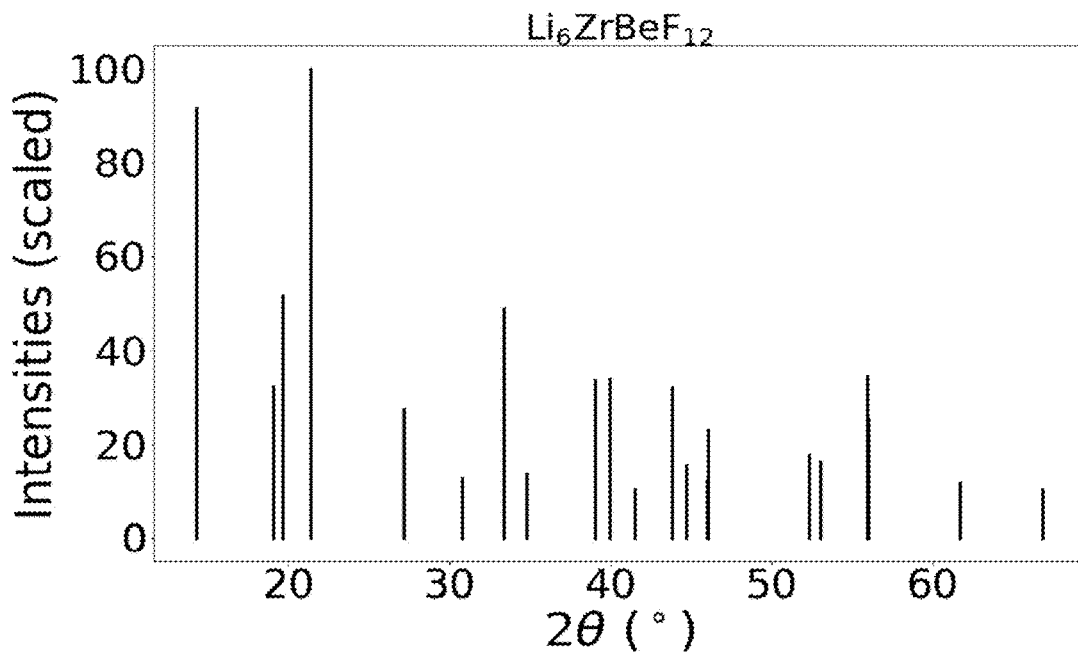
FIG. 8 shows a calculated XRD analysis obtained based on Cu-Kα radiation with wavelength of 1.54184 Å of the $Li_6ZrBeF_{12}$.
FIG. 9 shows a Table listing the major peak positions (2θ) and relative intensities for the XRD analysis of FIG. 8.
Figure 10:
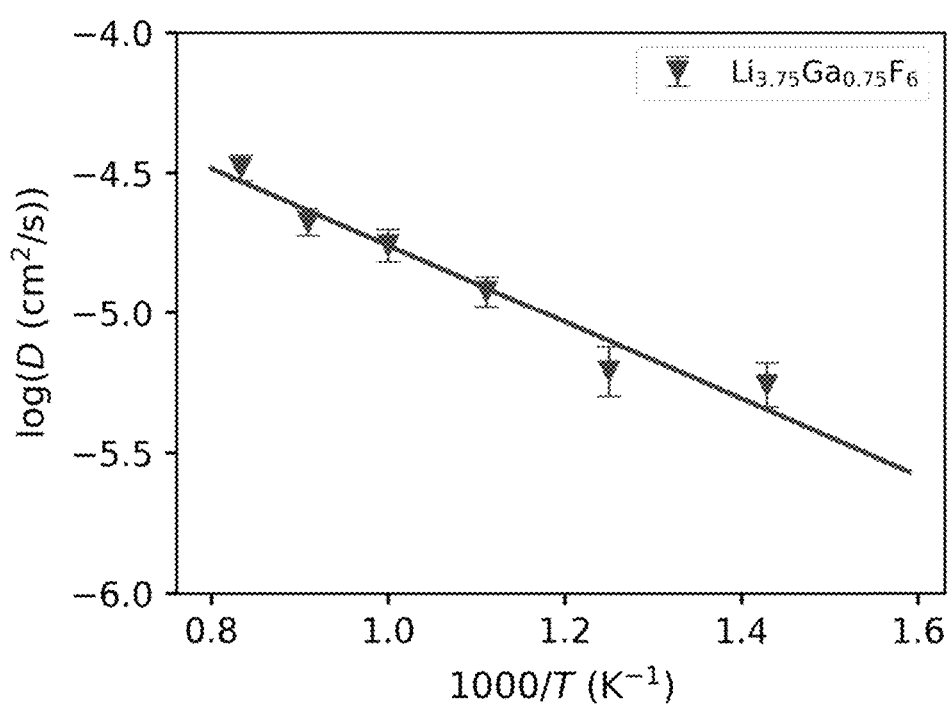
FIG. 10 shows an Arrhenius plot of $Li^+$ diffusivity D in $Li_3GaF_6$ doped as $Li_{3.75}Ga_{0.75}F_6$.
Figure 11:
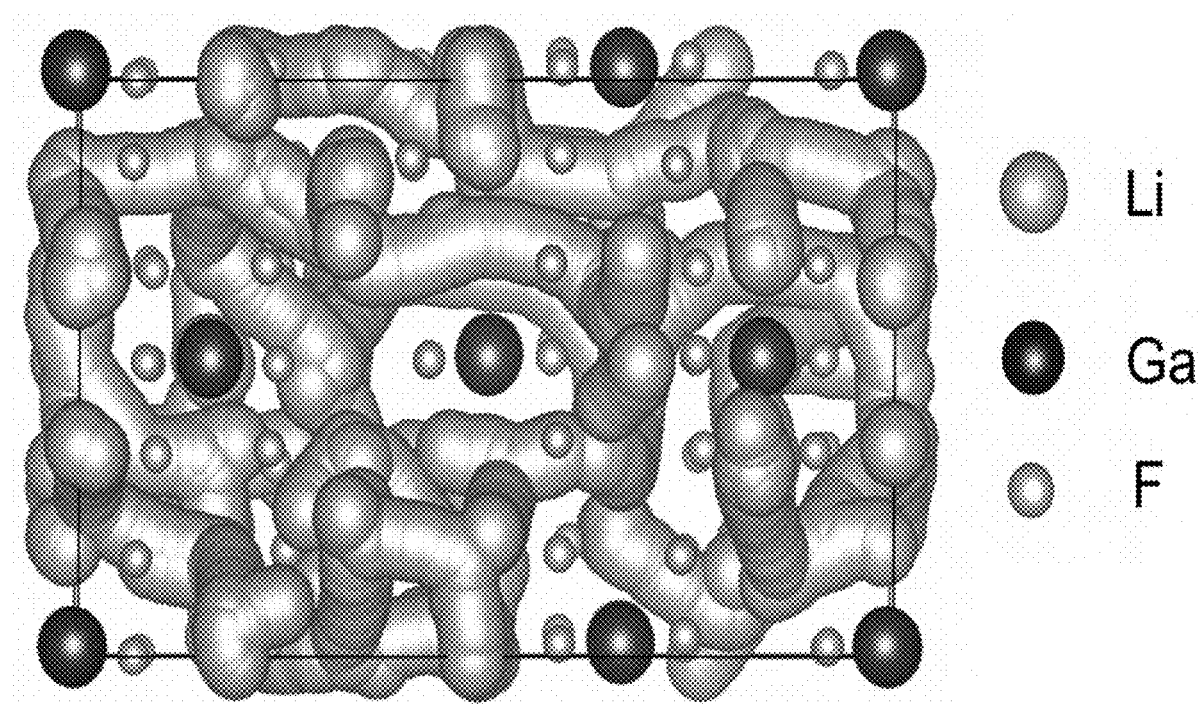
FIG. 11 shows the $Li^+$ diffusion trajectory and network in $Li_{3.75}Ga_{0.75}F_6$ from AIMD simulations.
Figure 12:
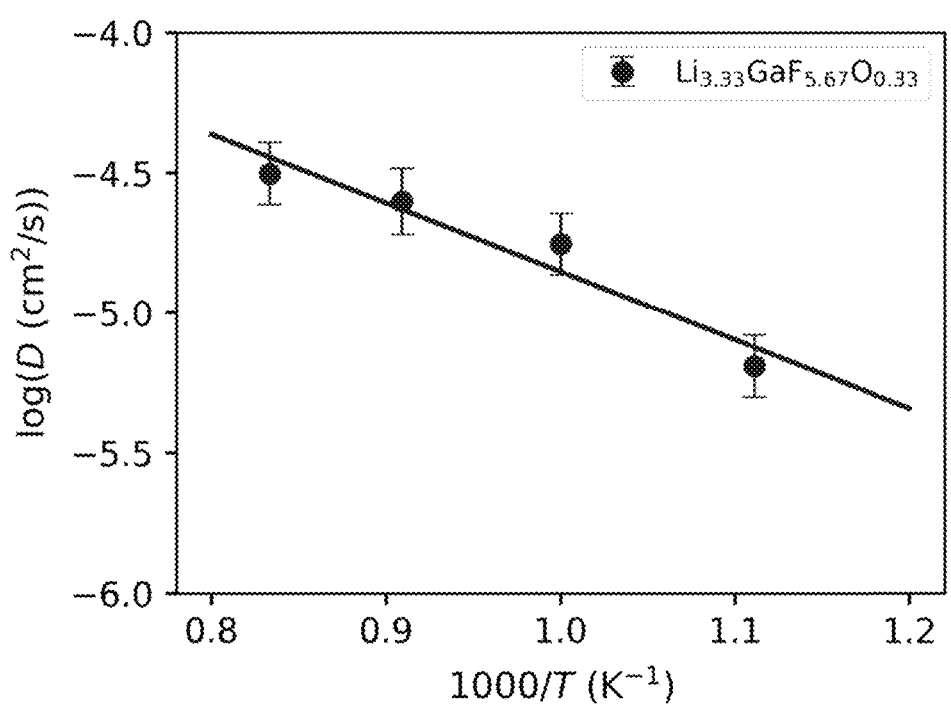
FIG. 12 shows an Arrhenius plot of $Li^+$ diffusivity D in $Li_3GaF_6$ doped as $Li_{3.33}GaO0.33F_{5.67}$.
Figure 13:
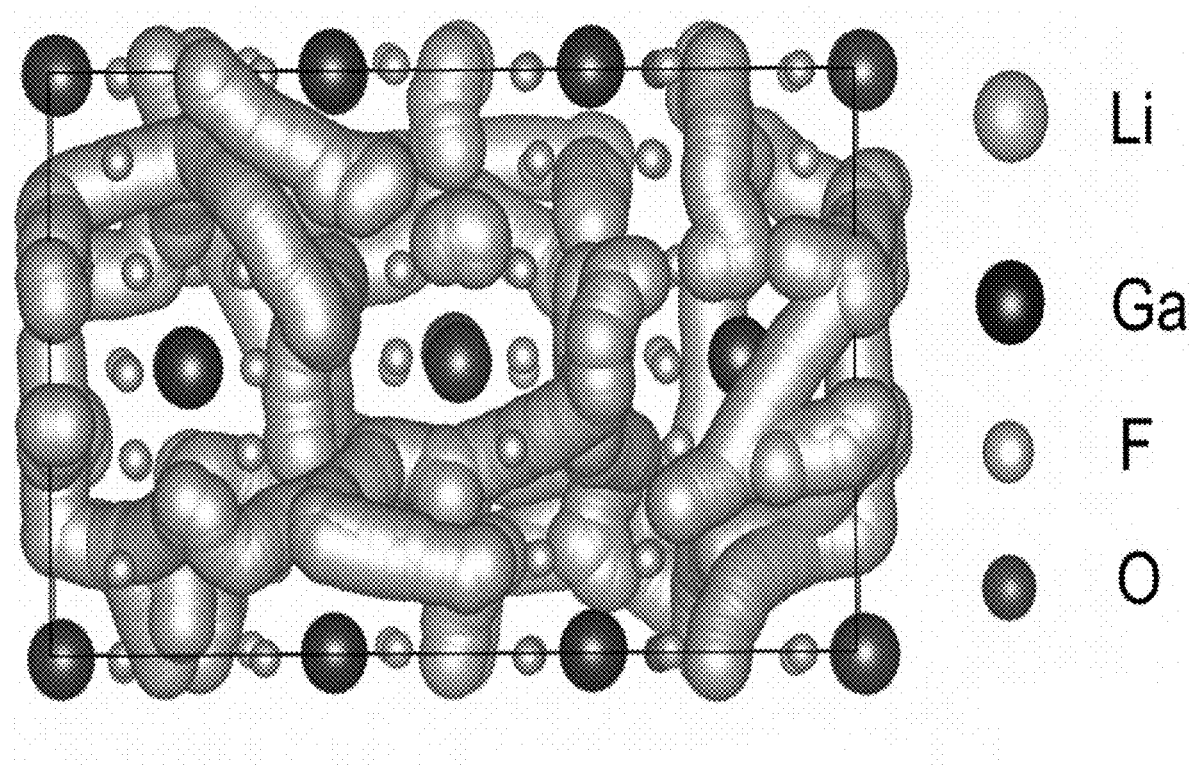
FIG. 13 shows the $Li^+$ diffusion trajectory and network in $Li_{3.33}GaO_{0.33}F_{5.67}$ from AIMD simulations.
Figure 14:
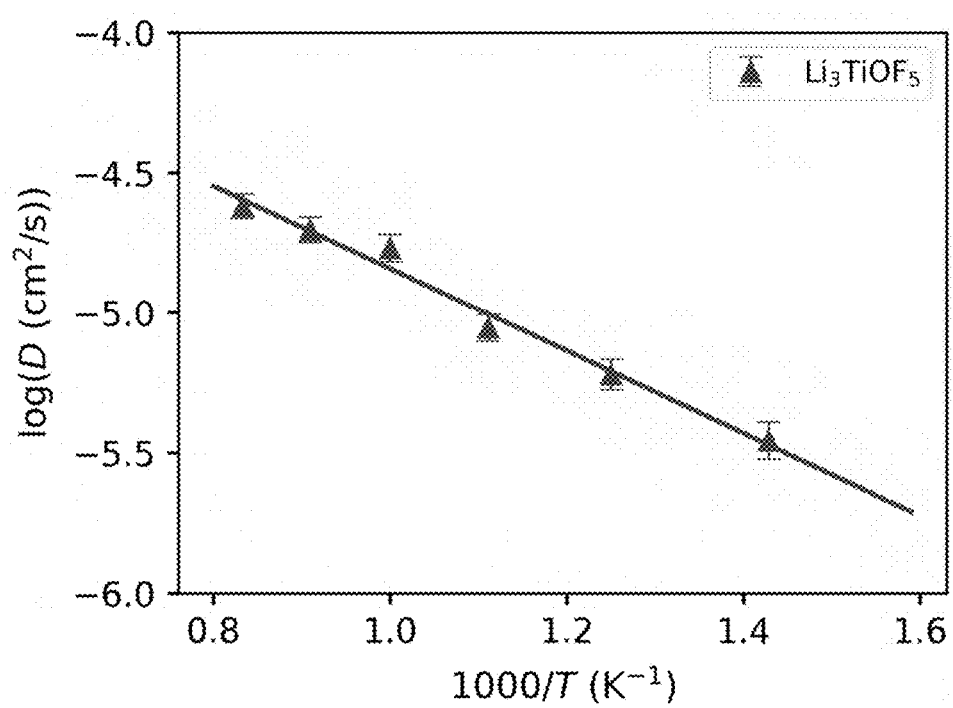
FIG. 14 shows an Arrhenius plot of Li$^+$ diffusivity D in Li$_2$TiF$_6$, doped as Li$_3$TiOF$_5$.
Figure 15:
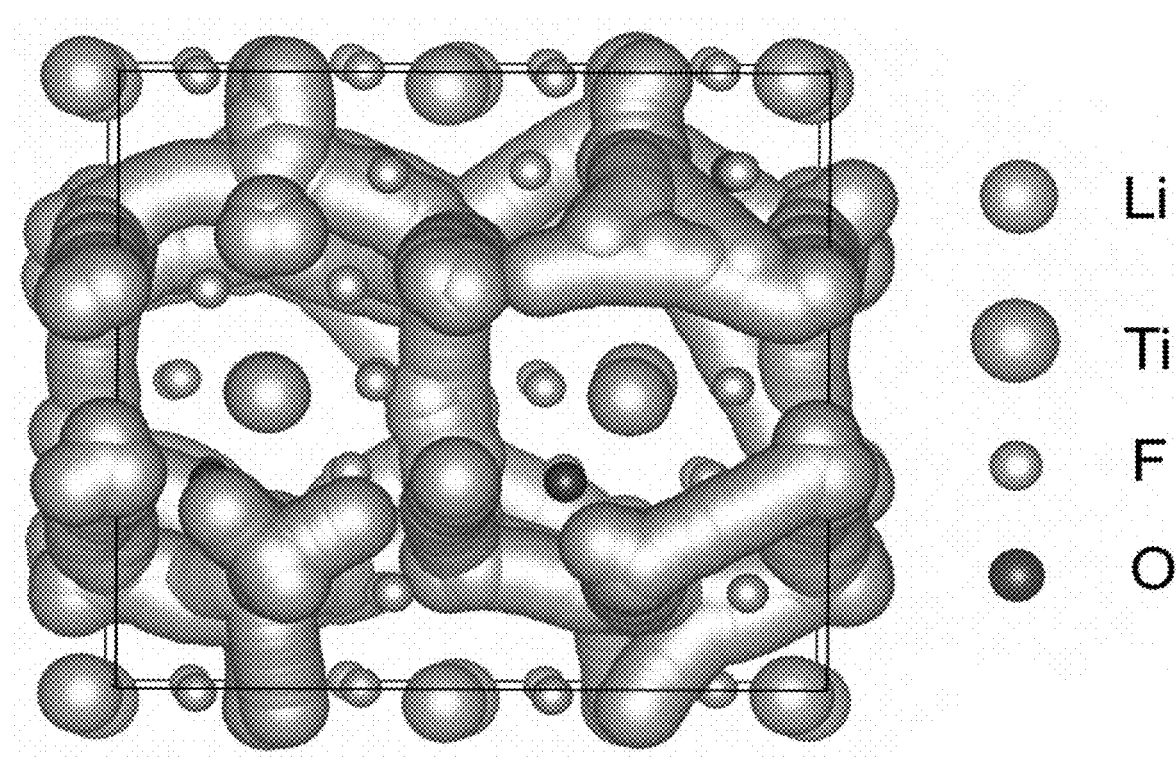
FIG. 15 shows the Li$^+$ diffusion trajectory and network in Li$_3$TiOF$_5$, from AIMD simulations.
Figure 16:
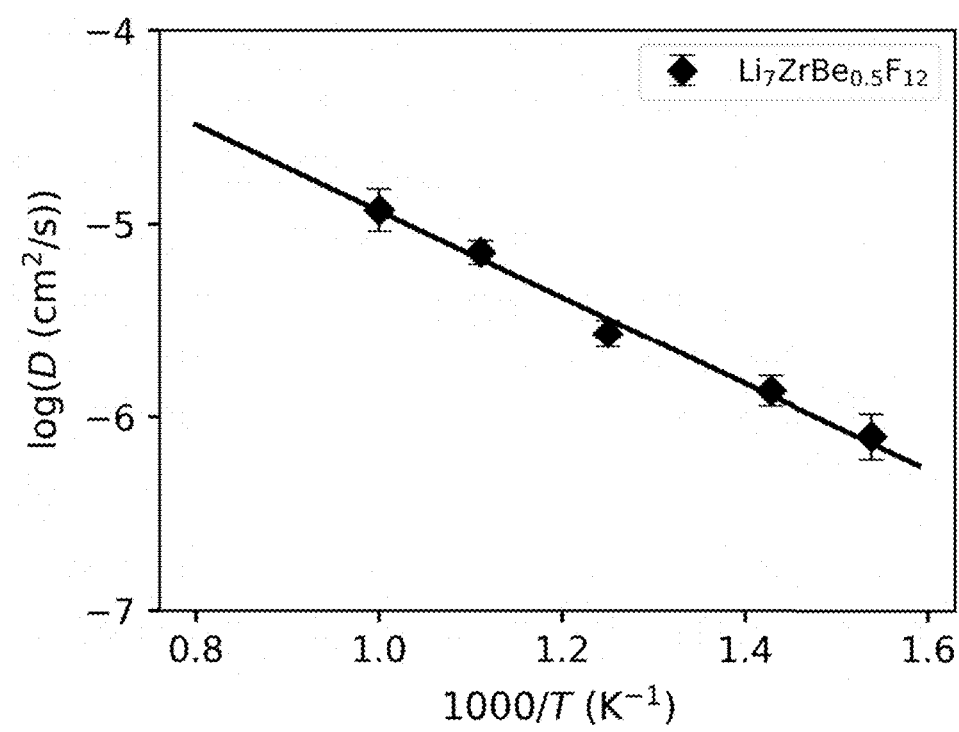
FIG. 16 shows an Arrhenius plot of Li$^+$ diffusivity D in Li$_6$ZrBeF$_{12}$, doped as Li$_7$ZrBe$_{0.5}$F$_{12}$.
Figure 17:
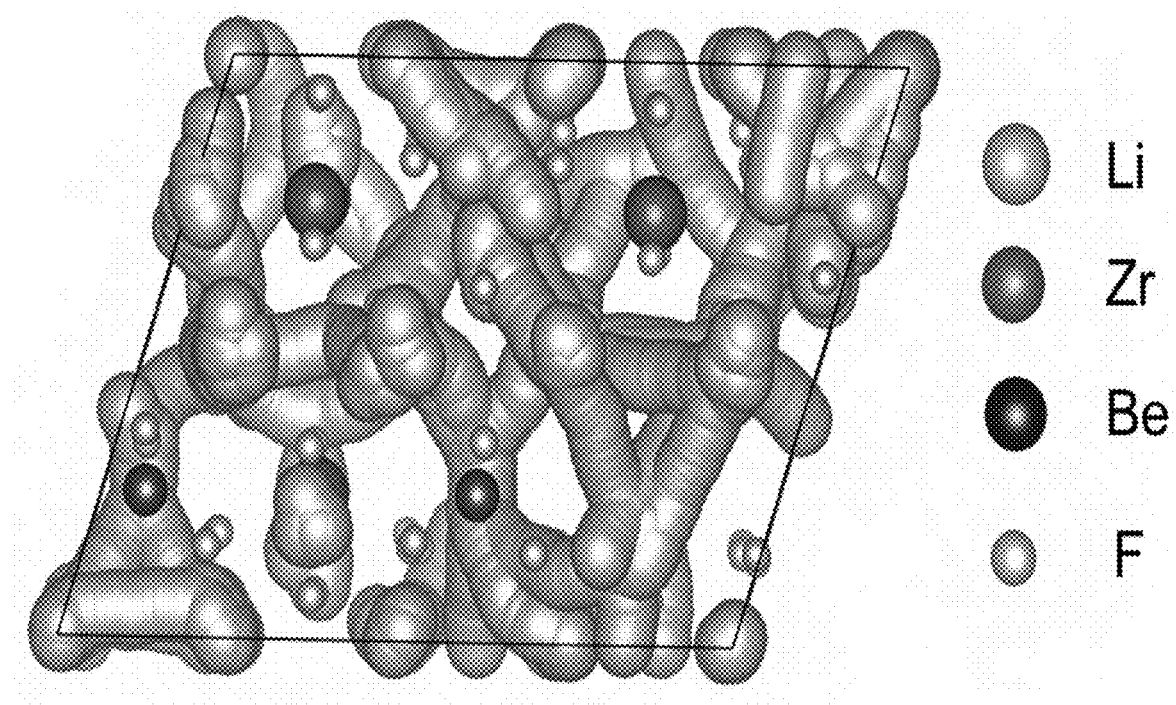
FIG. 17 shows the Li$^+$ diffusion trajectory and network in Li$_7$ZrBe$_{0.5}$F$_{12}$ from AIMD simulations.

The inventors have learned that the resulting doped materials according to formulae (IX) to (XII) retain the crystal structure of the base compound (XIII) and have activation energies and conductivity related to the base compound of formula (XIII). A calculated X-ray diffraction analysis for the composites of (IX) to (XIII) obtained based on Cu-Kα radiation with wavelength of 1.54184 Å is shown in FIG. 8 and a Table showing the major peak positions (2θ) is shown in FIG. 9. Based on the measurement methods described above the lithium ion (Li⁺) conductivity of the materials of formulae (IX), (X), (XI), and (XII) may be from 0.01 to 1.0 mS/cm at 300K, preferably from 0.001 to 0.1 mS/cm at 300K. The activation energy of the materials of formulae (IX), (X), (XI), and (XII) may be from 0.3 eV to 0.50 eV. The materials of formulae (IX), (X), (XI), and (XII) comprise a crystal lattice structure having a tetragonal unit cell.

Synthesis of the materials of the embodiments described above may be achieved by solid state reaction between stoichiometric amounts of selected precursor materials. Exemplary methods of solid state synthesis are described for example in each of the following papers: i) Monatshefte für Chemie, 100, 295-303, 1969; ii) Journal of Solid State Chemistry, 128, 1997, 241; iii) Zeitschrift für Naturforschung B,50,1995, 1061; iv) Journal of Solid State Chemistry 130, 1997, 90; v) Journal of Alloys and Compounds, 645, 2015, S174; and vi) Z. Naturforsch. 51b, 199652 5. Adaptation of these methods to prepare the materials according to the embodiments disclosed herein is well within the capibility of one of ordinary skill in the art. Synthesis methods for fluoride composites are described in Kohl et al. (J. Mater. Chem., 2012, 22, 15819), Choi et al. (Electrochimica Acta, 117, 2014) and Hamadéne et al. (Phase Transitions: Amultinational Journal, 73:3, p 423).

In further embodiments, the present application includes solid state lithium ion batteries containing the solid-state electrolytes described above. Solid-state batteries of these embodiments including metal-metal solid-state batteries may have higher charge/discharge rate capability and higher power density than classical batteries and may have the potential to provide high power and energy density.

Thus, in further embodiments, solid-state batteries comprising: an anode; a cathode; and a solid state lithium ion electrolyte according to the embodiments (I) to (XIII) described above, located between the anode and the cathode are provided.

Accordingly, in individual embodiments, the following batteries are provided:

i) A solid state lithium battery, comprising: an anode; a cathode; and a solid state lithium ion electrolyte located between the anode and the cathode; wherein the solid state lithium ion electrolyte comprises at least one material selected from the group of compounds of formulae (I), (II), (III) and (IV):

$$Li_y(M1)_{x1}GaF_6 \quad (I)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_yGa_{1-x2}(M2)_{x2}F_6 \quad (II)$$

wherein x2 is a number from greater than 0 to less then 1, y is a value such that charge neutrality is obtained, and M2 is at least one element different from Ga selected from elements of groups 1, 2, 3, 4, 5, 6, 7, 8, 9, 10, 11, 12, 13, 14, 16 and 17;

$$Li_yGaF_{6-x3}(X)_{x3} \quad (III)$$

wherein x3 is a number from greater than 0 to less than 6, y is a value such that charge neutrality is obtained, and X is at least one element different from F selected from elements of groups 15, 16 and 17; and $$Li_3GaF_6 \quad (IV);$$

ii) A solid state lithium battery, comprising: an anode; a cathode; and a solid state lithium ion electrolyte located between the anode and the cathode; wherein the solid state lithium ion electrolyte comprises at least one composite material selected from the group of compounds of formulae (V), (VI) and (VII):

$$Li_y(M1)_{x1}TiF_6 \quad (V)$$

wherein x1 is a number from greater than 0 to less than 2, y is a value such that charge neutrality is obtained, and M1 is at least one element different from Li selected from elements of groups 1, 2, 3, 4, 5, 6, 7, 8, 9, 10, 11, 12 and 13;

$$Li_yTi_{1-x2}(M^2)_{x2}F_6 \quad (VI)$$

wherein x2 is a number from greater than 0 to less than 1, y is a value such that charge neutrality is obtained, and M2 is at least one element different from Ti selected from elements of groups 3, 4, 5, 6, 7, 8, 9, 10, 11, 12, 14, 16 and 17; and $$Li_yTiF_{6-x3}(X)_{x3} \quad (VII)$$

wherein x3 is a number from greater than 0 to less than 6, y is a value such that charge neutrality is obtained, and X is at least one element different from F selected from elements of groups 15, 16 and 17; and iii) A solid state lithium battery, comprising: an anode; a cathode; and a solid state lithium ion electrolyte located between the anode and the cathode; wherein
the solid state lithium ion electrolyte comprises at least one composite material selected from the group of compounds of formulae (IX), (X),(XI), (XII) and (XIII):

$$Li_y(M1)_{x1}ZrBeF_{12} \tag{IX}$$

wherein x1 is a number from greater than 0 to less than 6, y is a value such that charge neutrality is obtained, and M1 is at least one element different from Li selected from elements of groups 1, 2, 3, 4, 5, 6, 7, 8, 9, 10, 11, 12 and 13;

$$Li_yZr_{1-x2}(M2)_{x2}BeF_{12} \tag{X}$$

wherein x2 is a number from greater than 0 to less than 1, y is a value such that charge neutrality is obtained, and M2 is at least one element different from Zr selected from elements of groups 3, 4, 5, 6, 7, 8, 9, 10, 11, 12, 14, 15 and 17; and

$$Li_yZrBe_{1-x3}(M3)_{x3}F_{12} \tag{XI}$$

wherein x3 is a number from greater than 0 to less than 1, y is a value such that charge neutrality is obtained, and M3 is at least one element different from Be selected from elements of groups 1, 2, 13, 14, 15 and 16; and

$$Li_yZrBeF_{12-x4}(X)_{x4} \tag{XII}$$

wherein x4 is a number from greater than 0 to less than 12, y is a value such that charge neutrality is obtained, and X is at least one element different from F selected from elements of groups 15, 16 and 17; and

$$Li_6ZrBeF_{12} \tag{XIII}.$$

The anode may be any anode structure conventionally employed in a lithium ion battery or lithium metal battery. Generally such materials are capable of insertion and extraction of Li$^+$ ions. Example anode active materials may include graphite, hard carbon, lithium titanate (LTO), a tin/cobalt alloy and silicon/carbon composites. In one aspect the anode may comprise a current collector and a coating of a lithium ion active material on the current collector. Standard current collector materials include but are not limited to aluminum, copper, nickel, stainless steel, carbon, carbon paper and carbon cloth. In an aspect advantageously arranged with the solid-state lithium ion conductive materials described in the first and second embodiments, the anode may be lithium metal or a lithium metal alloy, optionally coated on a current collector. In one aspect, the anode may be a sheet of lithium metal serving both as active material and current collector.

The cathode structure may be any conventionally employed in lithium ion batteries, including but not limited to composite lithium metal oxides such as, for example, lithium cobalt oxide (LiCoO$_2$), lithium manganese oxide (LiMn$_2$O$_4$), lithium iron phosphate (LiFePO$_4$) and lithium nickel manganese cobalt oxide. Other active cathode materials may also include elemental sulfur and metal sulfide composites. The cathode may also include a current collector such as copper, aluminum and stainless steel.

In one aspect, the active cathode material may be a transition metal, preferably, silver or copper. A cathode based on such transition metal may not include a current collector.

In a further set of embodiments, electrodes containing the solid electrolyte composites of formulae (I) to (XIII) are also disclosed. Thus in the preparation of the electrode the active material as described above may be physically mixed with the solid electrolyte material before application to the current collector or the solid electrolyte material may be applied as a coating layer on the applied active material. In either embodiment the presence of the lithium ion super conductor on or within the the electrode structure may enhance performance of the electrode, for example, by increase of capacity and/or charge/discharge cycling stability and especially when applied as a coating layer, may serve to protect a conventional solid state electrolyte. Further, such coating may serve to improve adhesion of the electrode surface with a solid state electrolyte.

Thus, an embodiment of the preseent disclosure includes an electrode for a solid state lithium battery, comprising: a current collector; an electrode active layer on the current collector; and a coating layer on the electrode active layer;
wherein the coating layer on the electrode active layer comprises a material of at least one of formulae (I)-(VII) and (IX)-(XIII):

$$Li_y(M1)_{x1}GaF_6 \tag{I}$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_yGa_{1-x2}(M2)_{x2}F_6 \tag{II}$$

wherein x2 is a number from greater than 0 to less then 1, y is a value such that charge neutrality is obtained, and M2 is at least one element different from Ga selected from elements of groups 1, 2, 3, 4, 5, 6, 7, 8, 9, 10, 11, 12, 13, 14, 16 and 17;

$$Li_yGaF_{6-x3}(X)_{x3} \tag{III}$$

wherein x3 is a number from greater than 0 to less than 6 , y is a value such that charge neutrality is obtained, and X is at least one element different from F selected from elements of groups 15, 16 and 17:

$$Li_3GaF_6 \tag{IV};$$

(V), (VI) and (VII):

$$Li_y(M1)_{x1}TiF_6 \tag{V}$$

wherein x1 is a number from greater than 0 to less than 2, y is a value such that charge neutrality is obtained, and M1 is at least one element different from Li selected from elements of groups 1, 2, 3, 4, 5, 6, 7, 8, 9, 10, 11, 12 and 13;

$$Li_yTi_{1-x2}(M^2)_{x2}F_6 \tag{VI}$$

wherein x2 is a number from greater than 0 to less than 1, y is a value such that charge neutrality is obtained, and M2 is at least one element different from Ti selected from elements of groups 3, 4, 5, 6, 7, 8, 9, 10, 11, 12, 14, 16 and 17; and

$$Li_yTiF_{6-x3}(X)_{x3} \tag{VII}$$

wherein x3 is a number from greater than 0 to less than 6, y is a value such that charge neutrality is obtained, and X is at least one element different from F selected from elements of groups 15, 16 and 17.

$$Li_y(M1)_{x1}ZrBeF_{12} \tag{IX}$$

wherein x1 is a number from greater than 0 to less than 6, y is a value such that charge neutrality is obtained, and M1 is at least one element different from Li selected from elements of groups 1, 2, 3, 4, 5, 6, 7, 8, 9, 10, 11, 12 and 13;

$$Li_yZr_{1-x2}(M2)_{x2}BeF_{12} \quad (X)$$

wherein x2 is a number from greater than 0 to less than 1, y is a value such that charge neutrality is obtained, and M2 is at least one element different from Zr selected from elements of groups 3, 4, 5, 6, 7, 8, 9, 10, 11, 12, 14, 15 and 17; and $$Li_yZrBe_{1-x3}(M3)_{x3}F_{12} \quad (XI)$$

wherein x3 is a number from greater than 0 to less than 1, y is a value such that charge neutrality is obtained, and M3 is at least one element different from Be selected from elements of groups 1, 2, 13, 14, 15 and 16; and $$Li_yZrBeF_{12-x4}(X)_{x4} \quad (XII)$$

wherein x4 is a number from greater than 0 to less than 12, y is a value such that charge neutrality is obtained, and X is at least one element different from F selected from elements of groups 15, 16 and 17; and $$Li_6ZrBeF_{12} \quad (XIII).$$

In another embodiment, the present disclosure provides an electrode for a solid state lithium battery, comprising: a current collector; and an electrode active layer on the current collector; wherein the electrode active layer comprises a composite compound of at least one of formulae (I)-(VII) and (IX)-(XIII):

$$Li_y(M1)_{x1}GaF_6 \quad (I)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_yGa_{1-x2}(M2)_{x2}F_6 \quad (II)$$

wherein x2 is a number from greater than 0 to less then 1, y is a value such that charge neutrality is obtained, and M2 is at least one element different from Ga selected from elements of groups 1, 2, 3, 4, 5, 6, 7, 8, 9, 10, 11, 12, 13, 14, 16 and 17;

$$Li_yGaF_{6-x3}(X)_{x3} \quad (III)$$

wherein x3 is a number from greater than 0 to less than 6, y is a value such that charge neutrality is obtained, and X is at least one element different from F selected from elements of groups 15, 16 and 17:

$$Li_3GaF_6 \quad (IV);$$

(V), (VI) and (VII):

$$Li_y(M1)_{x1}TiF_6 \quad (V)$$

wherein x1 is a number from greater than 0 to less than 2, y is a value such that charge neutrality is obtained, and M1 is at least one element different from Li selected from elements of groups 1, 2, 3, 4, 5, 6, 7, 8, 9, 10, 11, 12 and 13;

$$Li_yTi_{1-x2}(M^2)_{x2}F_6 \quad (VI)$$

wherein x2 is a number from greater than 0 to less than 1, y is a value such that charge neutrality is obtained, and M2 is at least one element different from Ti selected from elements of groups 3, 4, 5, 6, 7, 8, 9, 10, 11, 12, 14, 16 and 17; and $$Li_yTiF_{6-x3}PO_{x3} \quad (VII)$$

wherein x3 is a number from greater than 0 to less than 6, y is a value such that charge neutrality is obtained, and X is at least one element different from F selected from elements of groups 15, 16 and 17;

$$Li_y(M1)_{x1}ZrBeF_{12} \quad (IX)$$

wherein x1 is a number from greater than 0 to less than 6, y is a value such that charge neutrality is obtained, and M1 is at least one element different from Li selected from elements of groups 1, 2, 3, 4, 5, 6, 7, 8, 9, 10, 11, 12 and 13;

$$Li_yZr_{1-x2}(M2)_{x2}BeF_{12} \quad (X)$$

wherein x2 is a number from greater than 0 to less than 1, y is a value such that charge neutrality is obtained, and M2 is at least one element different from Zr selected from elements of groups 3, 4, 5, 6, 7, 8, 9, 10, 11, 12, 14, 15 and 17; and $$Li_yZrBe_{1-x3}(M3)_{x3}F_{12} \quad (XI)$$

wherein x3 is a number from greater than 0 to less than 1, y is a value such that charge neutrality is obtained, and M3 is at least one element different from Be selected from elements of groups 1, 2, 13, 14, 15 and 16; and $$Li_yZrBeF_{12-x4}(X)_{x4} \quad (XII)$$

wherein x4 is a number from greater than 0 to less than 12, y is a value such that charge neutrality is obtained, and X is at least one element different from F selected from elements of groups 15, 16 and 17; and $$Li_6ZrBeF_{12} \quad (XIII).$$

Thus, an embodiment of the present disclosure includes a cathode comprising a current collector and a layer of cathode active material applied to the current collector wherein at least one of the following components is present: i) the cathode active material applied to the current collector is a physical mixture containing at least one of the solid electrolyte composites of formulae (I) to (XIII) as described above; and ii) the layer of cathode active material applied to the current collector is coated with a layer comprising at least one of the solid electrolyte composites of formulae (I) to (XIII).

In related embodiments the present disclosure includes an anode comprising a current collector and a layer of anode active material applied to the current collector wherein at least one of the following components is present: i) the anode active material applied to the current collector is a physical mixture containing at least one of the solid electrolyte composites of formulae (I) to (XIII) as described above; and ii) the layer of anode active material applied to the current collector is coated with a layer comprising at least one of the solid electrolyte composites of formulae (I) to (XIII).

Batteries containing a cathode as described in the above embodiment, an anode described in the above embodiment or containing both an anode and cathode according to the above embodiments are also embodiments of the present disclosure.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A solid-state lithium ion electrolyte, comprising:
at least one composite material selected from the group of compounds of formulae (IX), (X), (XI), (XII) and (XIII):

$$Li_y(M1)_{x1}ZrBeF_{12} \quad (IX)$$

wherein x1 is a number from greater than 0 to less than 6, y is a value such that charge neutrality is obtained, and M1 is at least one element different from Li selected from elements of groups 1, 2, 3, 4, 5, 7, 8, 9, 10, 11, 12 and 13;

$$Li_yZr_{1-x2}(M2)_{x2}BeF_{12} \quad (X)$$

wherein x2 is a number from greater than 0 to less than 1, y is a value such that charge neutrality is obtained, and M2 is at least one element different from Zr selected from elements of groups 3, 4, 5, 6, 7, 8, 9, 10, 11, 12, 14, 15 and 17; and $$Li_yZrBe_{1-x3}(M3)_{x3}F_{12} \quad (XI)$$

wherein x3 is a number from greater than 0 to less than 1, y is a value such that charge neutrality is obtained, and M3 is at least one element different from Be selected from elements of groups 1, 2, 13, 14, 15 and 16; and $$Li_yZrBeF_{12-x4}(X)_{x4} \quad (XII)$$

wherein x4 is a number from greater than 0 to less than 12, y is a value such that charge neutrality is obtained, and X is at least one element different from F selected from elements of groups 15, 16 and 17; and $$Li_6ZrBeF_{12} \quad (XIII).$$

2. The solid state lithium ion electrolyte according to claim 1, wherein
a lithium ion conductivity is from 0.001 to 0.1 mS/cm at 300K,
an activation energy of the the composite materials of formulae (IX), (X), (XI), (XII) and (XIII) is from 0.3 eV to 0.50 eV, and
the composite materials of formulae (IX), (X), (XI), (XII) and (XIII) comprise a crystal lattice structure having a tetragonal unit cell.

3. The solid state lithium ion electrolyte according to claim 1, wherein art X-ray diffraction analysis (XRD) obtained based on Cu-Kα radiation with wavelength of 1.54184 Å comprises the following major peaks;

| Peak Position | Relative Intensity |
| --- | --- |
| 14.30 | 91.76 |
| 19.07 | 32.49 |
| 19.68 | 51.72 |
| 21.38 | 100.00 |
| 27.15 | 27.47 |
| 30.81 | 12.83 |
| 33.38 | 49.08 |
| 34.76 | 13.73 |
| 39.05 | 33.81 |
| 39.97 | 33.98 |
| 41.52 | 10.35 |
| 43.84 | 32.26 |
| 44.69 | 15.53 |
| 45.99 | 12.41 |
| 46.03 | 23.14 |
| 52.33 | 17.73 |
| 53.04 | 16.43 |
| 55.92 | 34.62 |
| 55.99 | 25.58 |
| 61.70 | 11.69 |
| 66.77 | 10.35. |

4. A solid state lithium battery, comprising:
an anode;
a cathode; and
a solid state lithium ion electrolyte located between the anode and the cathode;
wherein
the solid state lithium ion electrolyte comprises at least one composite material selected from the group of compounds of formulae (IX), (X),(XI), (XII) and (XIII)

$$Li_y(M1)_{x1}ZrBeF_{12} \quad (IX)$$

wherein x1 is a number from greater than 0 to less than 6, y is a value such that charge neutrality is obtained, and M1 is at least one element different from Li selected from elements of groups 1, 2, 3, 4, 5, 6, 7, 8, 9, 10, 11, 12 and 13;

$$Li_yZr_{1-x2}(M2)_{x2}BeF_{12} \quad (X)$$

wherein x2 is a number from greater than 0 to less than 1, y is a value such that charge neutrality is obtained, and M2 is at least one element different from Zr selected from elements of groups 3, 4, 5, 6, 7, 8, 9, 10, 11, 12, 14, 15 and 17; and $$Li_yZrBe_{1-x3}(M3)_{x3}F_{12} \quad (XI)$$

wherein x3 is a number from greater than 0 to less than 1, y is a value such that charge neutrality is obtained, and M3 is at least one element different from Be selected from elements of groups 1, 2, 13, 14, 15 and 16; and $$Li_yZrBeF_{12-x4}(X)_{x4} \quad (XII)$$

wherein x4 is a number from greater than 0 to less than 12, y is a value such that charge neutrality is obtained, and X is at least one element different from F selected from elements of groups 15, 16 and 17; and $$Li_6ZrBeF_{12} \quad (XIII).$$

5. An electrode for a solid state lithium battery, comprising:
a current collector; and
an electrode active layer on the current collector;
wherein the electrode active layer comprises a composite compound of at least one of formulae (IX)

$$Li_y(M1)_{x1}ZrBeF_{12} \quad (IX)$$

wherein x1 is a number from greater than 0 to less than 6, y is a value such that charge neutrality is obtained, and M1 is at least one element different from Li selected from elements of groups 1, 2, 3, 4, 5, 6, 7, 8, 9, 10, 11, 12 and 13;

$$Li_yZr_{1-x2}(M2)_{x2}BeF_{12} \quad (X)$$

wherein x2 is a number from greater than 0 to less than 1, y is a value such that charge neutrality is obtained, and M2 is at least one element different from Zr selected from elements of groups 3, 4, 5, 6, 7, 8, 9, 10, 11, 12, 14, 15 and 17; and $$Li_yZrBe_{1-x3}(M3)_{x3}F_{12} \quad (XI)$$

wherein x3 is a number from greater than 0 to less than 1,
y is a value such that charge neutrality is obtained, and
M3 is at least one element different from Be selected
from elements of groups 1, 2, 13, 14, 15 and 16; and $$Li_yZrBeF_{12-x4}(X)_{x4} \qquad (XII)$$

wherein x4 is a number from greater than 0 to less than 12,
y is a value such that charge neutrality is obtained, and
X is at least one element different from F selected from
elements of groups 15, 16 and 17; and $$Li_6ZrBeF_{12} \qquad (XIII).$$

6. A solid state lithium battery comprising the electrode of claim 5, wherein the solid state lithium battery is a lithium ion battery or a lithium metal battery.

7. An electrode for a solid state lithium battery, comprising:
a current collector;
an electrode active layer on the current collector; and a coating layer on the electrode active layer;
wherein the coating layer on the electrode active layer comprises a composite compound of at least one of formulae (IX)-(XIII):

$$Li_y(M1)_{x1}ZrBeF_{12} \qquad (IX)$$

wherein x1 is a number from greater than 0 to less than 6,
y is a value such that charge neutrality is obtained, and
M1 is at least one element different from Li selected
from elements of groups 1, 2, 3, 4, 5, 6, 7, 8, 9, 10, 11, 12 and 13;

$$Li_yZr_{1-x2}(M2)_{x2}BeF_{12} \qquad (X)$$

wherein x2 is a number from greater than 0 to less than 1,
y is a value such that charge neutrality is obtained, and
M2 is at least one element different from Zr selected
from elements of groups 3, 4, 5, 6, 7, 8, 9, 10, 11, 12, 14, 15 and 17; and $$Li_yZrBe_{1-x3}(M3)_{x3}F_{12} \qquad (XI)$$

wherein x3 is a number from greater than 0 to less than 1,
y is a value such that charge neutrality is obtained, and
M3 is at least one element different from Be selected
from elements of groups 1, 2, 13, 14, 15 and 16; and $$Li_yZrBeF_{12-x4}(X)_{x4} \qquad (XII)$$

wherein x4 is a number from greater than 0 to less than 12,
y is a value such that charge neutrality is obtained, and
X is at least one element different from F selected from
elements of groups 15, 16 and 17; and $$Li_6ZrBeF_{12} \qquad (XIII).$$

8. A solid state lithium battery comprising the electrode of claim 7, wherein the solid state lithium battery is a lithium ion battery or a lithium metal battery.

* * * * *